United States Patent [19]

Nutto

[11] Patent Number: 5,667,117
[45] Date of Patent: Sep. 16, 1997

[54] FASTENING DEVICE

[76] Inventor: Uwe Nutto, Boelkestrasse 19, D-79100 Freiburg, Germany

[21] Appl. No.: 454,336

[22] PCT Filed: Dec. 13, 1993

[86] PCT No.: PCT/DE93/01195

§ 371 Date: Aug. 11, 1995

§ 102(e) Date: Aug. 11, 1995

[87] PCT Pub. No.: WO94/13526

PCT Pub. Date: Jun. 23, 1994

[30] Foreign Application Priority Data

Dec. 15, 1992 [DE] Germany .......... 42 42 211.6

[51] Int. Cl.[6] ............................. B62J 9/00
[52] U.S. Cl. .............. 224/417; 224/430; 224/585
[58] Field of Search .................... 224/151, 30 R, 224/31, 32 R, 32 A, 39, 584, 585, 416, 417, 419, 424, 428, 430, 441, 442, 447, 448, 449, 450, 451, 452, 453

[56] References Cited

U.S. PATENT DOCUMENTS

| | | | |
|---|---|---|---|
| 3,786,972 | 1/1974 | Alley | 224/32 A |
| 3,937,374 | 2/1976 | Hine, Jr. | 224/417 |
| 4,244,496 | 1/1981 | Litz | 224/32 R |
| 4,271,996 | 6/1981 | Montgomery | 224/32 |
| 4,295,586 | 10/1981 | Shockley | 224/31 |
| 4,433,802 | 2/1984 | Woolf | 224/153 |
| 4,487,344 | 12/1984 | Blackburn et al. | 224/32 A |
| 4,491,258 | 1/1985 | Jones | 224/153 |
| 4,577,786 | 3/1986 | Dowrick et al. | 224/417 |
| 4,580,706 | 4/1986 | Jackson | 224/32 |

FOREIGN PATENT DOCUMENTS

| | | | |
|---|---|---|---|
| 63797 | 11/1942 | Denmark | 224/32 A |
| 1127921 | 12/1956 | France | 224/32 R |
| 1158664 | 6/1958 | France | 224/31 |
| 3513878 | 4/1986 | Germany | 224/32 A |
| 3532332 | 3/1987 | Germany | 224/30 R |
| 3618611 | 12/1987 | Germany . | |
| 124500 | 3/1949 | Sweden | 224/30 R |
| 385741 | 1/1933 | United Kingdom | 224/32 R |
| 2253136 | 9/1992 | United Kingdom | 224/31 |

*Primary Examiner*—Henry J. Recla
*Assistant Examiner*—Gregory M. Vidovich
*Attorney, Agent, or Firm*—Panitch Schwarze Jacobs & Nadel, P.C.

[57] ABSTRACT

A fastening device for alternatively fastening bags (4, 5, 7, 8) on a bicycle consists of a hanging device arranged on an upper fitting, which engages a fastening device located on the bicycle frame or a reception device, forming a knapsack (84) together with other bags (4, 5, 6, 7, 8). Whereas the fittings of the front wheel bags (7, 8) are equipped with hanging elements, the fittings of the rear wheel bags (7, 8) are provided with reception devices. The rear wheel bags (7, 8) may be linked to the bicycle frame by means of a carrier fastened only to the saddle support. Thus the bags (4, 5, 7, 8) may be in no time and in a modular manner, by insertion, mounted on or dismounted from the bicycle or assembled together into a knapsack and disassembled.

14 Claims, 9 Drawing Sheets

FASTENING DEVICE

FIELD OF THE INVENTION

The invention relates to a fastening device for alternatively fastening bags on a bicycle or for fastening them together to compose a knapsack.

BACKGROUND OF THE INVENTION

U.S. Pat. No. 4,491,258 has disclosed bags having three storage elements capable of being stiffened by reinforcing strips in a knapsack mode. In the bicycle pannier mode, these reinforcing strips are to keep the bags from hitting the spokes unchecked when the bicycle is in motion.

When the known bags are used as bicycle panniers, they are placed over bicycle racks so that two of the three storage elements of a bag hang down next to the rear wheel and next to the front wheel. Two smaller front wheel bags are to be interconnected to form a unit by a divisible zip fastener, by snap fasteners and by elastic bungy cords before they are placed on the front rack. The bungy cords are then fastenable by hooks to the rack supports. The larger bag is intended for fastening to the rear rack and is fixed to the rack supports or bicycle frame with the aid of straps.

When the three bags are assembled to form a knapsack, they are first placed side by side with the larger rear wheel bag arranged between the then parted front wheel bags. The three bags are interconnected by connecting respective zip fasteners and snap fasteners. To stiffen the knapsack thus composed, the strips are slid into sleeves provided on the back of the rear wheel bag. To impart greater dimensional stability to the knapsack as a whole, the knapsack assembled from the bags is provided with a plurality of straps surrounding it lengthwise and crosswise.

Although transport of the bags on a bicycle with the aid of the known fastening devices is satisfactory on well-surfaced roads, this fastening mode is inadequate when riding on bad stretches of road and particularly cross-country. Through the shocks occuring, laden bags are liable to slip due to their inertia, often causing falls particularly when negotiating curves or when riding cross-country. When heavily loaded, the cords and straps are under such a strain that they often tear or the seams sewing the straps onto the bag are ripped open.

Furthermore the use of racks proves to be disadvantageous for transportation of the bicycle laden with bags, because the wheels often have to be taken off the bicycle for reasons of space. The racks remaining on the bicycle frame are nevertheless in the way and also susceptible to damage. It is troublesome to remove the racks from the bicycle, especially since in addition to carrying the bags a cyclist then also has to carry the detached racks.

U.S. Pat. No. 4,433,802 has disclosed a bicycle pannier—knapsack device having a rack which is detachable from the bicycle and is usable as a frame when two carried bags are combined to form a knapsack.

This device has the drawback, however, that the parts of the rack used as the knapsack frame have to be interconnected with the aid of several clevis pins. Even though this ensures that the rack members can to some degree be varied to accommodate the size of the person carrying the knapsack, change of mode is made complicated and tedious by the bothersome removal of the spring clip fasteners.

The known fastening devices fail to provide an acceptable solution, particularly for sporty cyclists who are known to be very exacting when it comes to the functionality of the items they use and therefore expect that the bags fastened to the bicycle can be converted and assembled to form a knapsack in no time.

SUMMARY OF THE INVENTION

The object underlying the invention is therefore to provide a fastening device which ensures that, in addition to fastening bags on the bicycle sufficiently securely for cross-country rides, the bags can be mounted on or dismounted from the bicycle and can be combined to form a knapsack quickly and simply.

This object is accomplished according to the invention in that arranged on the external bag surfaces facing the bicycle are rigid fittings secured on the rear wall reinforcement of the bags, said fittings taking the form of either hanging elements or reception devices for the hanging elements, wherein the bags are furnished in pairs with fittings presenting hanging element or with fittings presenting reception device.

Since the fittings provided for connecting the individual bags are rigidly connected to the rear wall reinforcement assigned to a bag, the bags can be attached or fitted in a modular manner in companion parts situated on the bicycle or on another bag, without it being necessary to first apply and then tighten numerous different straps. Furthermore a fastening device is provided, permitting a rigid connection of the bags to be established to the bicycle and to one another in the knapsack mode.

Since the bags are furnished in pairs with fittings presenting the hanging elements or the reception devices, a knapsack can be assembled from four bags by simply fitting the hanging elements into the respective reception devices. To establish the rigid connection there is a quick attachment means provided at each suitable location and it is suitably swivel-mounted on one side of a reception device.

A hanging element is preferably formed in a T-shape by a web and a retainer and a reception device preferably takes the form of an L-shaped recess. The fasteners are in each case arranged on a fitting situated on the broadside of a bag and project vertically from the pouch of the bag. The configuration of the reception device is complementary to the cross section of the web of the hanging element.

To mount the front wheel bags on the bicycle, there is a fastener on each fork blade of the front wheel. The fastener has a pin and a quick attachment means and is co-operatively connectable to the upper hanging element of a front wheel bag. Since the front wheel bag can therefore be fastened with its hanging element directly to the fork blade, a front carrier is superfluous. For heavy duty it is advantageous if in the region of the front axle a locating pin be additionally provided, engaging with a corresponding reception device on the bag, for instance a fork-shaped locating member.

The rear wheel bags are adapted to be fastened on the bicycle with the aid of quick attachment means by way of a carrier. A reception device is incorporated in the lower fitting of the rear wheel bag as the second point of fixation and engages with a companion part fastened on the bicycle frame. The carrier itself is preferably three-membered and adapted to be fastened to the seat pillar likewise by means of a quick attachment means, so as to be effortlessly detachable from the bicycle. Since the rear walls of the bags are reinforced and since they are rigidly connected to the carrier, the bags themselves perform the function of conventional carrier supports.

In a further exemplary embodiment, the fittings of a rear wheel bag are arranged in such a way that in the area of their reception devices they are 90° offset away from the bag. The reception devices have essentially the same features as the fasteners provided on the front wheel fork. Use of these reception devices simplifies assembly of the knapsack.

Further developments and merits of the invention follow from the sub-claims and from the description of the figures given below, in which

DETAILED DESCRIPTION OF PREFERRED EMBODIMENTS

Figure 1:
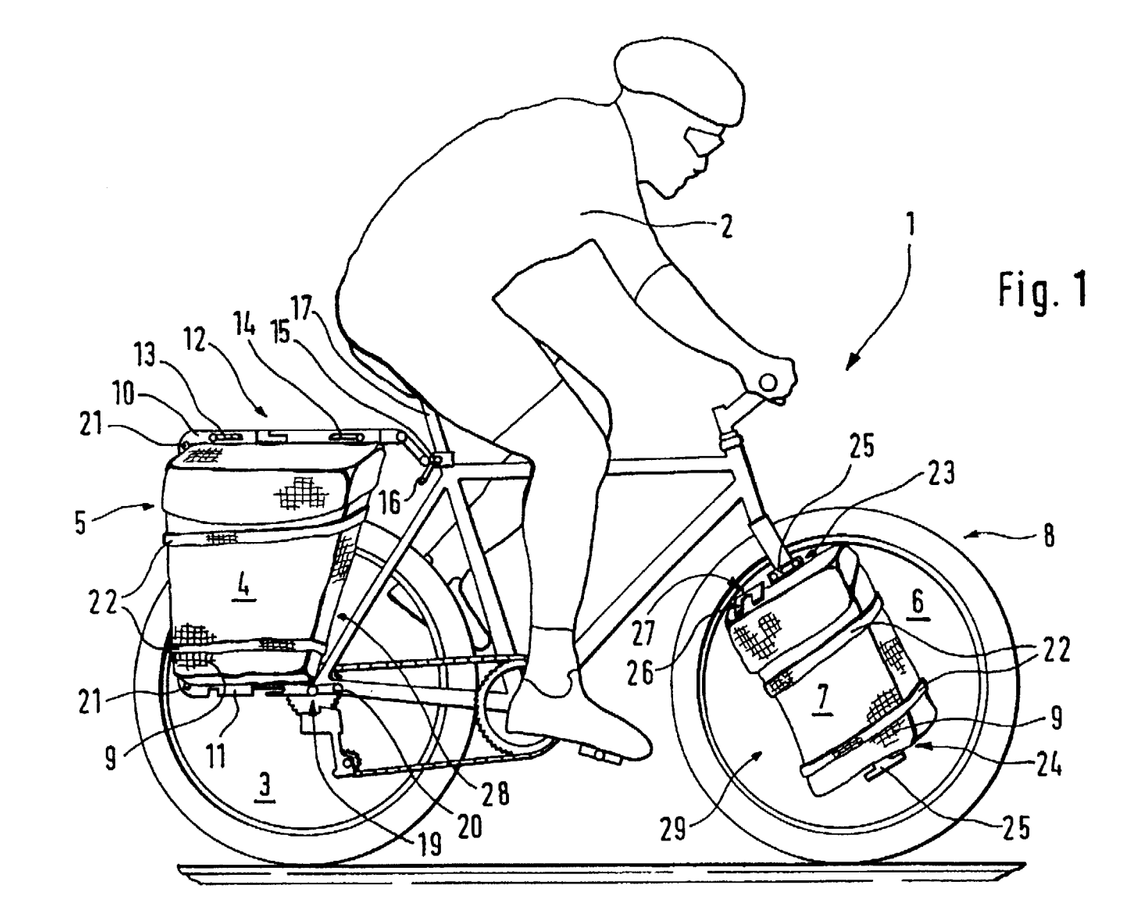
FIG. 1 is a semi-perspective side view of a bicycle ridden by a cyclist, with fitted bags.

FIG. 1 depicts a semi-perspective side view of a bicycle 1 ridden by a cyclist 2. Rear wheel bags 4, 5 are mounted at both sides of the rear wheel 3 and front wheel bags 7, 8 are mounted at both sides of the front wheel 6 of the bicycle 1. The bags 4, 5, 7, 8 consist essentially of a pouch 9 made of waterproof fabric. Arranged on the pouch side facing the respective wheel 3, 6 are fasteners for mounting the bags 4, 5, 7, 8 on the bicycle 1.

The rear wheel bag 4 has an upper fitting 10 and a lower fitting 11. Both fittings 10, 11 project vertically from the pouch 9 and extend substantially throughout the width of the pouch 9.

The rear wheel bag 4 is connected to the bicycle 1 by a carrier 12 arranged above the rear wheel 3. The connection of the rear wheel bag 4 to the carrier 12 can be established by two quick attachment means 13, 14. The carrier 12 is three-membered and has a front connecting piece 15 engaged with the quick attachment means 16 for fixing the seat pillar 17 in position. The carrier 12 is therefore simply detachable from the bicycle 1 by solely releasing the quick attachment means 16 and by lifting out the connecting piece 15.

In that area of the fitting 11 which is located to the fore in the direction of travel there is a recess 19 with which the rear wheel bag 4 is set on the rear axle of the bicycle 1 in the region of the rear wheel quick attachment means 20.

In a further development, the recess 19 can be set on a pin placed into a soldering point in the region of the rear axle.

Those ends of the fittings 10, 11 which are to the rear in the direction of travel extend beyond the width of the pouch 9. In each projecting portion of the fittings 10, 11 is one eyelet 21. Carrying straps can be fastened in the eyelets 21 when the bag 4 is used assembled together with the other bags 5, 7, 8 to form a knapsack.

Two tension straps 22 each consisting of two pieces held together by a Velcro fastener surround the rear wheel bag 4 so that it can be compressed when only partly filled.

The configuration of the rear wheel bag 5 is essentially one of mirror symmetry to the rear wheel bag 4 with respect to the longitudinal axis of the bicycle 1.

The front wheel bag 7 has an upper fitting 23 and a lower fitting 24, both projecting vertically from the pouch 9 at least in areas. The fittings 23, 24 each have a T-shaped hanging element 25 centrally arranged in relation to the width of the bag 7. One assembly angle 26 is provided at each of those ends of the fittings 23, 24 which are situated to the rear in the direction of travel. The assembly angle side at essentially 90° is directed to the front of the bag 7 and has a recess 27. The front wheel bag 7 is likewise provided with tension straps 22.

The configuration of the lefthand front wheel bag 8 in the direction of travel is essentially one of mirror symmetry to the front wheel bag 7 with respect to the longitudinal axis of the bicycle 1.

It is advantageous for the rear wheel bags 4, 5 to be designed with a slanting side portion 28 pointing forwards in the direction of travel. In a plan view of the front of the rear wheel bags 4, 5, the narrower end then points downwards. In this manner a clearance is left between the cyclist's heels and the front side portion 28 of the rear wheel bags 4, 5 sufficient to not obstruct pedalling, even for bicycles 1 with a short distance between the rear axle and the pedal crank.

The concave shaping of that side 29 of the front bags 7, 8 which is to the rear in the direction of travel serves to better accommodate a cyclist's back when the two front wheel bags 7, 8 are assembled together with the two rear wheel bags 4, 5 to form a carrying unit, preferably a knapsack.

Figure 2:
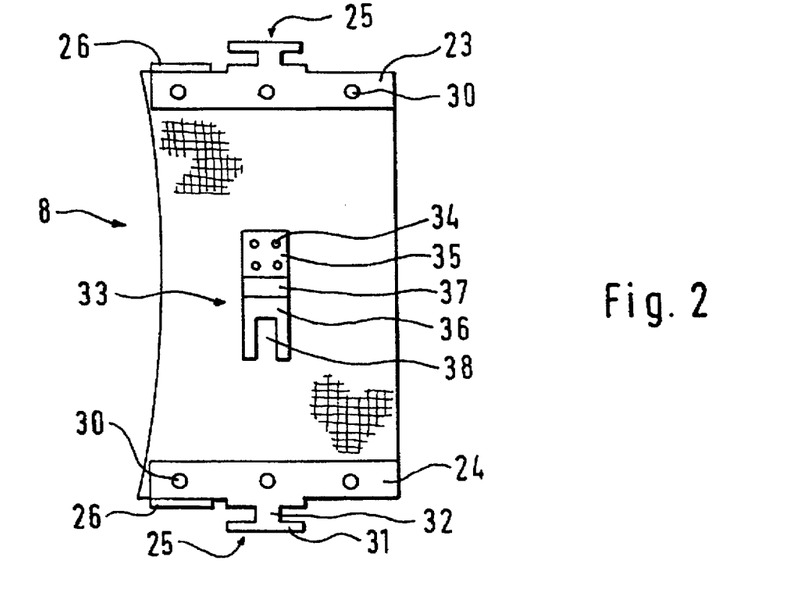
FIG. 2 is a plan view of the back of a lefthand front wheel bag in the direction of travel.

FIG. 2 depicts a plan view of the back of the lefthand front wheel bag 8 in the direction of travel. The upper fitting 23 and lower fitting 24 are fastened with rivets 30 to the back of the bag 8. The T-shaped hanging elements 25, one departing from the upper fitting 23 and one from the lower fitting 24, project vertically from the pouch in an upward and downward direction, respectively.

The T-shaped hanging element 25 essentially consists of a retainer 31 which extends lengthwise of the fittings 23, 24, and is centrally connected thereto by a web 32. The assembly angle 26 is visible at that end of the fittings 23, 24 which is to the rear in the direction of travel.

In the central area of the back of bag 8 there is a forked locating member 33 firmly connected by rivets 34 to the front wheel bag 8. The locating member 33 has a fastening portion 35 bearing directly against the back of the front wheel bag 8, a forked coupling portion 36 in spaced relationship to the back and a crosspiece 37 connecting the fastening portion 35 to the coupling portion 36. A U-shaped recess 38 is formed in the forked coupling portion 36.

Figure 3:
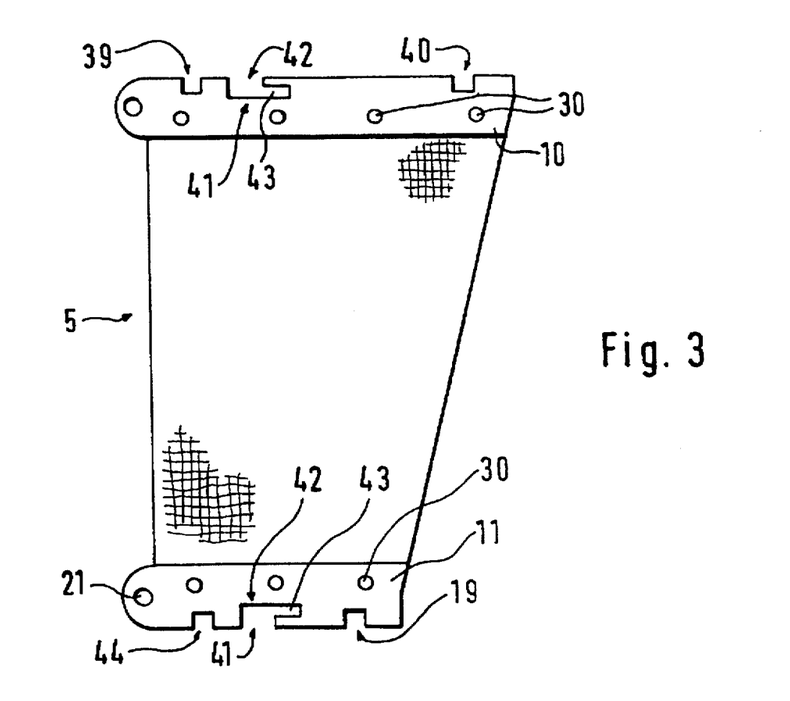
FIG. 3 is a plan view of the back of a lefthand rear wheel bag in the direction of travel.

FIG. 3 depicts a plan view of the back of the lefthand rear wheel bag 5. The upper fitting 10 and the lower fitting 11 are fastened to the back of the rear wheel bag 5 by rivets 30. The upper fitting 10 has two recesses 39, 40 for fastening the rear wheel bag 5 to the carrier 12 by quick attachment means.

Furthermore the fittings 10, 11 are provided with L-shaped recesses 41 each oriented in the same direction. The L-shaped recesses 41 have a socket 42 beginning at the outer edge of the fittings 10, 11 and, departing from the socket 42, a retaining slot 43 extending in the direction of travel. The width of the socket 42 opening corresponds essentially to the width of the web 32 of the front wheel bag 7, 8. The width of the retaining slot 43 corresponds essentially to the thickness of the web 32.

The recess 19 for setting the rear wheel bag 5 on the rear axle is provided in the lower fitting 11 at the side thereof to the fore in the direction of travel. Opposite recess 39 of the upper fitting 10 is a recess 44 of the same configuration in the lower fitting 11, serving as a further fastener when assembling the bags 4, 5, 7, 8 to form a knapsack. The eyelets 21 for attaching carrying straps are provided in the fittings 10, 11 at the ends thereof to the rear in the direction of travel. Carrying straps can be clipped into the eyelets 21 by, for instance, snap hooks. In a further development, the eyelets 21 are designed as oblong holes for the carrying straps to be passed through directly.

Figure 4:
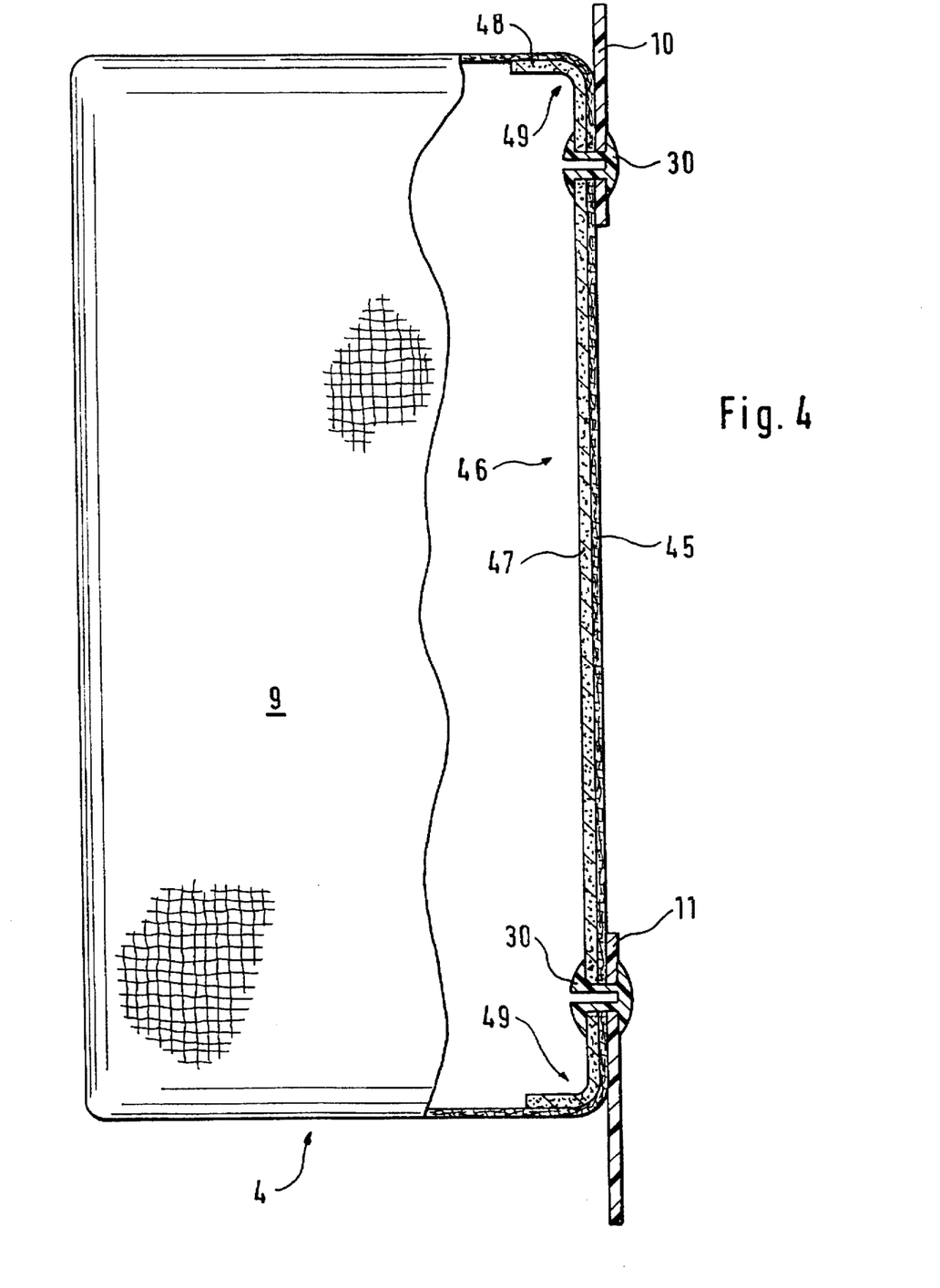
FIG. 4 is a schematic, partly sectional side view of a rear wheel bag with an internal rear wall reinforcement having an element stiffening the edge.

FIG. 4 depicts a partly sectional view of the design of bag 4 at its back facing the wheel 3. The bag 4 consists essentially of the pouch 9, the back 45 of which is stiffened by a rear wall reinforcement 46 situated in the pouch 9. The rear wall reinforcement 46 extends substantially throughout the rear wall of the pouch 9. The rear wall reinforcement 46 consists of a plate portion 47 and an edge stiffening element 48 provided along the entire periphery of the plate portion 47.

It is advantageous, as illustrated in FIG. 4, to provide a curvature 49 between the plate portion 47 and the edge stiffening element 48, so as to avoid the danger of the pouch 9 tearing at the transition between the plate portion 47 and the edge stiffening element 48.

The fittings 10, 11 are externally applied to the back 45 and are securely connected to the rear wall reinforcement 46 by rivets 30. The rivet fastening is waterproof in the same way as the fabric of the pouch 9. Mounting the fittings 10, 11 on the outside of the pouch 9 simultaneously fixes the back 45 of the pouch 9 to the rear wall reinforcement 46. Through the large bearing area of the fittings 10, 11 on the fabric, the pouch 9 is prevented from tearing in the area of the rivets 30, even when heavily loaded.

In a further exemplary embodiment (not shown), the rear wall reinforcement 46 constitutes the back of the bag 4, 5, 7, 8, with the side pieces of the pouch 9 adhesively secured to the rear wall reinforcement.

Figure 5:
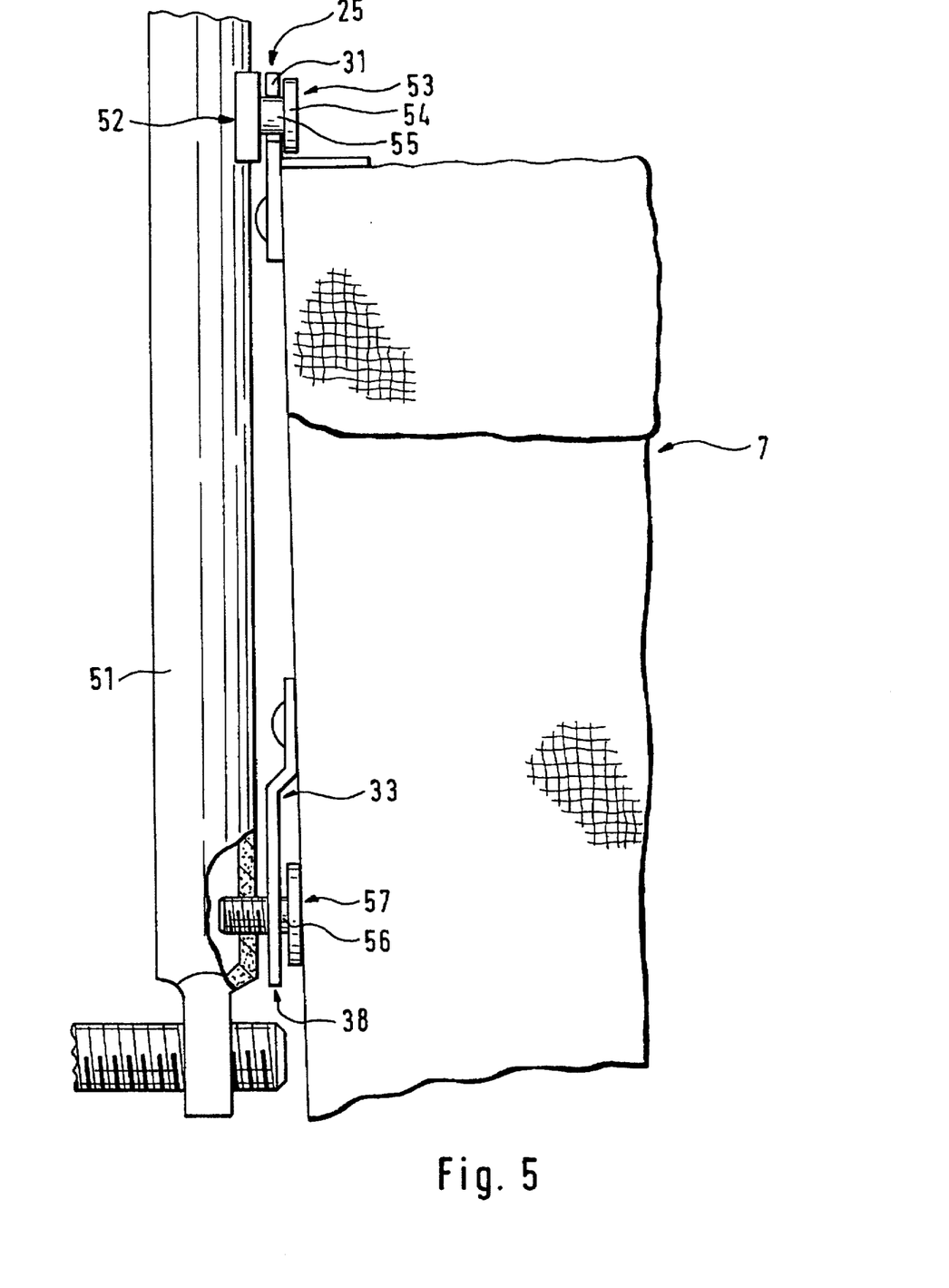
FIG. 5 is a partly sectional view of a front wheel bag mounted on the righthand bicycle fork blade in the direction of travel.

FIG. 5 depicts the righthand front wheel bag 7 mounted on the righthand fork blade 51 viewed in the direction of travel. The upper hanging element 25 engages the front wheel bag 7 with a fastener 52 mounted on the fork blade 51. In the perspective view of FIG. 6, the fastener 52 has at its rearward end in the direction of travel a pin 53 consisting of a head 54 and a shank 55, the head 54 being distinctly larger in diameter than the shank 55. The bag 7 is slipped with the retainer 31 of the hanging element 25 onto the shank 55, so that the weight of the bag 7 is supported by the pin 53.

The U-shaped recess 38 of the locating member 33 is slipped over the shank 56 of a locating pin 57 screwed into the fork blade 51. In a further development the locating pin 57 is provided on a soldering point situated at the lower end of the fork blade.

It is advantageous that the upper end of the recess 38 does not bear on the shank 56 of the locating pin 57, so that sufficient clearance is left for the bicycle fork to swing freely. It is also possible for the coupling portion 36 and thus for the U-shaped recess 38 of the locating member 33 to be far longer than shown in FIG. 6 in order not to impede the spring action when the front wheel bag 7 is mounted on a bicycle fork spring-cushioned in its lower portion. Damage to the rear wall reinforcement might be caused by the recess end 38 acting as a stop being placed on the shank 56.

Figure 6:
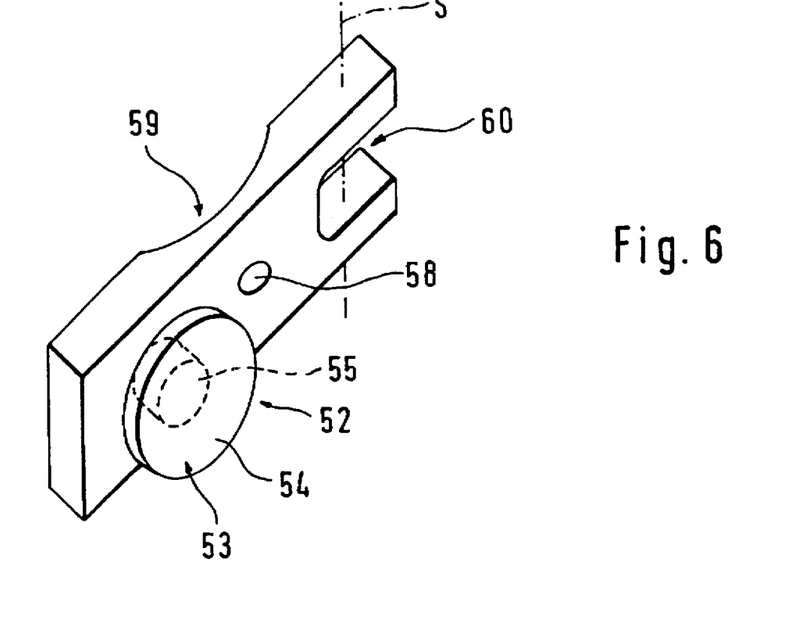
FIG. 6 is a perspective view of a fastener provided for mounting a front wheel bag on a bicycle fork.

The fastener 52 of FIG. 5, attachable to the fork blade 51 by means of a screw (not shown) passed through a bore 58, is shown in an enlarged view in FIG. 6. In order to obtain a larger mounting surface, a fork recess 59 is provided on that side of the fastener 52 which faces the fork blade 51. The pin 53 is mounted at the rearward end of the fastener 52 in the direction of travel. A U-shaped recess 60 is provided at the forward end of the fastener 52 in the direction of travel. When the retainer 31 arranged on the front wheel bag 7 has been attached, the recess 60 becomes substantially congruent with the forward recess of the hanging element 25 in the direction of travel, so that the hanging element 25 and the fastener 52 are interconnectable by a quick attachment means.

In a further development of the fastener 52 shown in FIG. 6, the quick attachment means provided for connection is directly attached to the fastener 52. The abutment opposite the eccentric part of the quick attachment means is fitted in the recess 60 so as to be capable of swivelling about the axis S in FIG. 6. This has the advantage that the released quick attachment means are captive and that, after a front wheel bag 7, 8 has been attached, the quick attachment means only has to be swivelled over the hanging element 25 and can then be thrown over for fastening.

Figure 7:
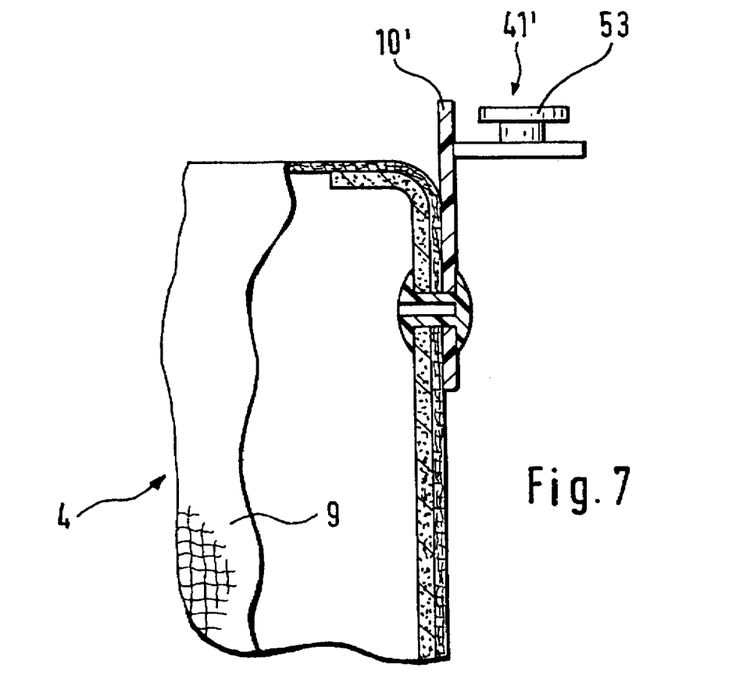
FIG. 7 is a further embodiment of a reception device located on a rear wheel bag.

FIG. 7 shows a detail of a further rear wheel bag 4 wherein the upper fitting 10' is 90° offset away from the pouch 9 in the area of its reception device 41'. The reception device 41' has essentially the same features as the fastener 52 described with respect to FIG. 6. In this exemplary embodiment it is proposed particularly that the quick attachment means used are fastened directly to the reception device 41'. The lower fittings of the rear wheel bag 4 are configured accordingly.

Figure 8:
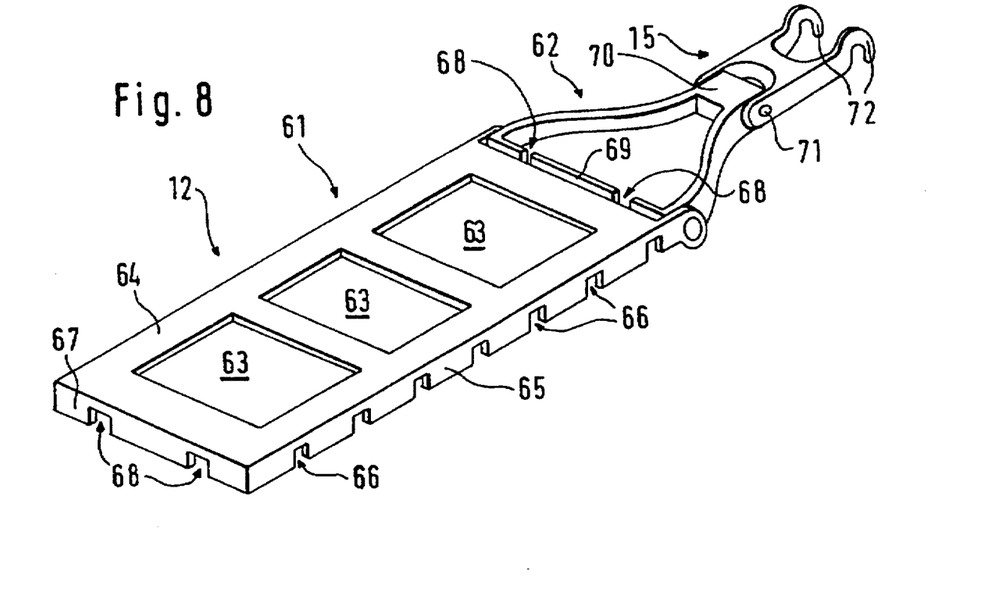
FIG. 8 is a perspective view of a carrier provided for fitting two rear wheel bags on the bicycle.

FIG. 8 depicts a perspective view of the carrier 12 used for connecting the two rear bags 4, 5. The carrier 12 is three-membered and has a carrying piece 61, a middle piece 62 and the connecting piece 15.

The carrying piece 61 is longer than the upper fitting of a rear wheel bag 4, 5. As explained further below, it is advantageous that the length of the carrying piece 61 substantially corresponds to double the depth of a filled rear wheel bag 4, 5. The carrying piece 61 consists essentially of a carrier plate 64 provided with openings 63. It is advantageous that the carrier plate 64 be designed to have a flat upper surface, in order that additional items of luggage can be fastened on the carrying piece 61.

The carrier plate 64 is provided with two side pieces 65 which extend in its lengthwise direction and point downwards.

The side pieces 65 project beyond the length of the carrier plate 64 at the end to the fore in the direction of travel. The side pieces 65 are provided with a plurality of recesses 66 in spaced relationship to one another such that in each case two recesses 66 are congruent with the recesses 39, 40 located in the upper fitting of the rear wheel bag. Through the recesses 66 and 39, 66 and 40, in contiguity during assembly, quick attachment means are usable for fastening the rear wheel bags to the side portions 65 of the carrier 12. The openings 63 allow fingers to reach the nuts of quick attachment means when thereby connecting rear wheel bags to the carrier 12.

The two side pieces 65 are interconnected by a back piece 67 provided with recesses 68 spaced in accordance with the spacing between the recess 39 and the socket 42 of the upper fitting 10 and lower fitting 11.

The carrying piece 61 is swivel-mounted to the stirrup-shaped middle piece 62. A crosspiece 69 of increased width, situated to the rear in the direction of travel, is arranged between those portions of the side pieces 65 which project beyond the carrier plate 64. The crosspiece 69 is provided with recesses having upward openings. A crosspiece 70 of reduced width, situated to the fore in the direction of travel, is linked to the connecting piece 15 by way of a joint 71. Unlike the swivel connection between the carrying piece 61 and the middle piece 62, joint 71 is lockable by a quick attachment means situated on the rear side not visible in FIG. 8. The connecting piece 15 has in its portion to the fore in the direction of travel two coupling claws 72 which can be jammed at the quick attachment means 16 of the seat pillar 17 when the carrier 12 is fitted to the bicycle 1.

Since the carrier 12 is three-membered and is provided with numerous recesses 66 in the side pieces 65 of the carrying piece 61, it is possible for a user to fasten the back wheel bags with the carrier 12 to bicycle frames of different sizes.

In a further development of the carrier 12, the recesses 66 in the side pieces 65 are replaced by bores with tapped bushes into which the quick attachment means for mounting the rear wheel bags 4, 5 cab be screwed.

Figures 9, 10:
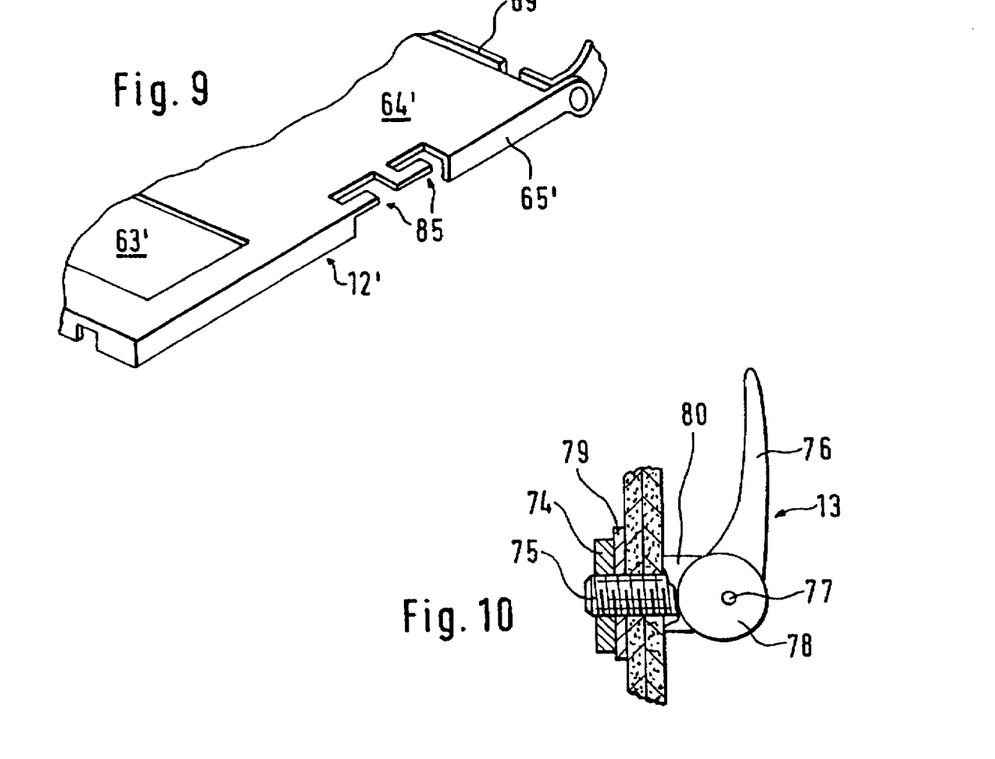
FIG. 9 is a detail of a further carrier for fitting two rear wheel bags on the bicycle according to FIG. 7.
FIG. 10 is a partly sectional view of a quick attachment means shown in the slack condition and provided for fastening the bags.

FIG. 9 shows a detail of a further carrier 12', the side pieces 65' of which are formed with a reception device 41' in the fastening area of the rear wheel bag 4. The carrier plate 64' has only one rear opening 63'. In the central area of the carrier plate 64' are two L-shaped recesses 85 of essentially the same design for receiving the pin 53 and for receiving the shank of the quick attachment means mounted on the fastener.

In a further development of the L-shaped recesses 85, the area thereof which in FIG. 9 runs parallel to the side pieces 65' is formed at an increasing distance from the side pieces 65'. In this way the rear wheel bags 4, 5 are sure to be connectable to the carrier 12' so as to rest snugly against the side pieces 65'.

FIG. 10 shows a detailed, partly sectional view of the above-mentioned quick attachment means 13. The quick attachment means 13 consists essentially of a two-ribbed nut 74, a threaded rod 75 and a gripping lever 76. The gripping lever 76 engages with the threaded rod 75 via a pin 77 fitted to the latter. The pin 77 is rotatable in the eccentric part 78 of the gripping lever 76. In order that the elements to be gripped between the two-ribbed nut 74 and the eccentric part 78 are protected from damage, a shim 79 is provided on the side facing the two-ribbed nut 74 and an eccentric bearing 80 is provided on the side facing the gripping lever 76.

To detach the front wheel bags 7, 8 from the bicycle 1, the quick attachment means used for connecting the hanging element 25 to the fastener 52 is opened. Then the front wheel bag 7, 8 is rotated forwards in the direction of travel, about the axis of the locating pin 57 situated on the fork blade 51, to detach the retainer 31 from pin 57. By lifting the front wheel bag 7, 8, the forked locating member 33 slips off the locating pin 57, so that the front wheel bag 7, 8 is fully detached from the bicycle 1. Only the fastener 52, possibly with the quick attachment means attached thereto, and the locating pin 57 remain on the fork blade 51.

To remove the rear wheel bag 4, 5 from the bicycle 1, first the quick attachment means 13, 14 are opened so that the rear wheel bag 4, 5 is detached from the carrier 12 and is just connected to the bicycle 1 by the rear wheel quick attachment means 20. While the cyclist 2 holds the rear wheel bag 4 with one hand, the rear wheel quick attachment means 20 is opened so far that the lower fitting 11 can be lifted with recess 19 off the rear axle. The rear wheel bag 4, 5 can then be laid down next to the bicycle 1.

The carrier 12 is removable from the bicycle 1 by opening the quick attachment means 16 and by then drawing the claws 72 out of the seat pillar grip. After the rear wheel bags 4, 5 and the carrier 12 have been removed, there is therefore no fastener and in particular no obstructive luggage carrier left in the region of the rear wheel 3.

Figure 11:
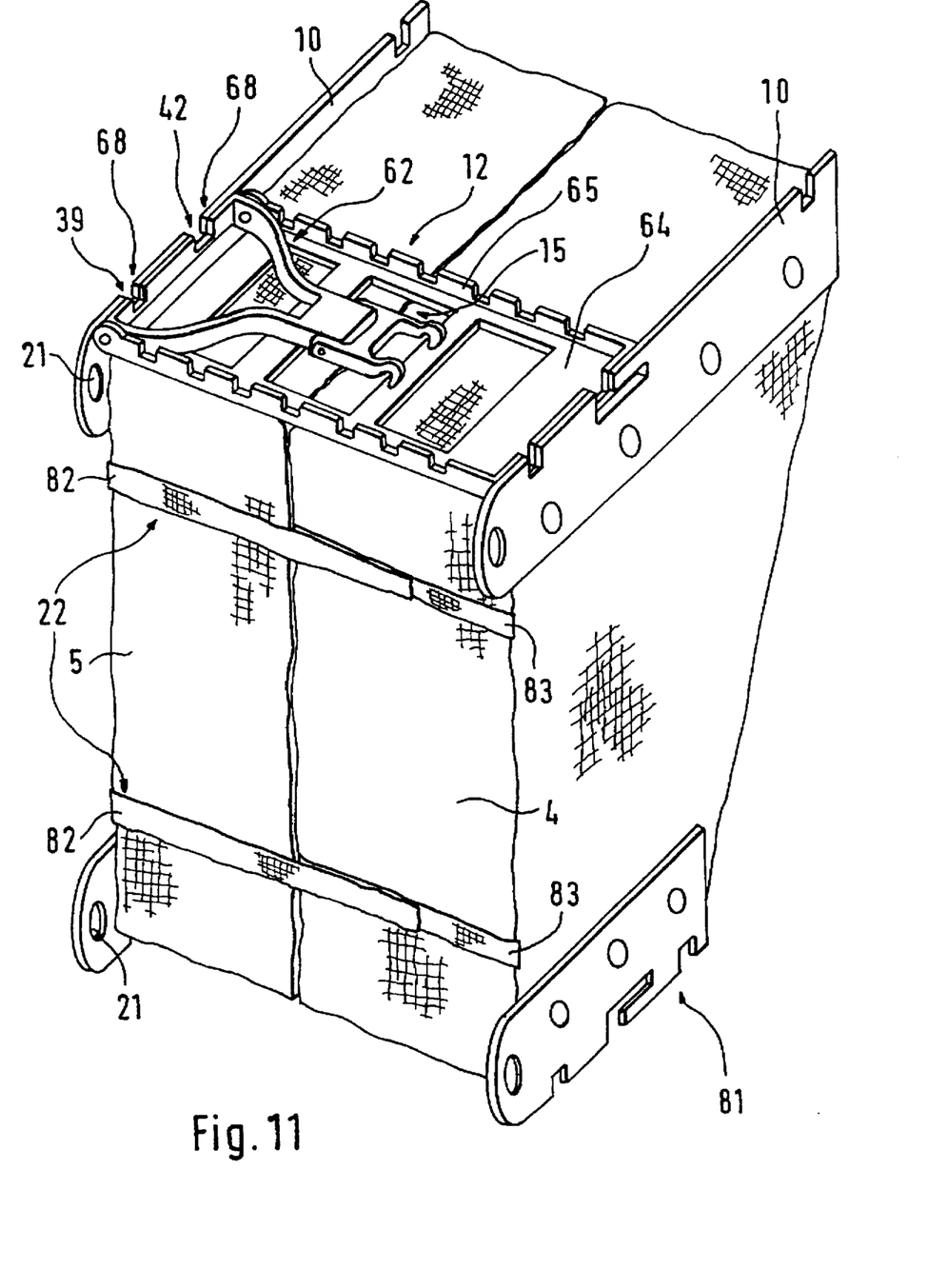
FIG. 11 is a perspective view of a knapsack formed by two rear wheel bags, the quick attachment means required for rigid connection not being shown.

As shown in FIG. 11, the two rear wheel bags 4, 5 can be assembled to form a knapsack 81. The quick attachment means used for securely holding the knapsack 81 together are not illustrated.

First the rear wheel bags 4, 5 are placed front sides together. Since the tension straps 22 have two parts and shorter strap pieces 82 are provided on the rearward side of the rear wheel bag 5 in the direction of travel, while longer strap pieces 83 are provided on the rearward side of rear wheel bag 4 in the direction of travel, it is possible for the two rear wheel bags 4, 5 to be held together by strap pieces 82, 83, as illustrated in FIG. 11. It is advantageous to provide the shorter strap pieces 82 and longer strap pieces 83 as two parts of a Velcro fastener.

The carrier 12 is inserted between the portions of fittings 10 projecting above the rear wheel bags 4, 5, with the centre piece 62 together with the connecting piece 15 folded under the carrier plate 64. The side pieces 65 point upwards. The carrier 12 is adjusted until the upwardly open recesses 68 are congruent with the recess 39 and socket 42 of the upper fitting 10. The carrier 12 is securely connected to the upper fittings 10 of the two rear wheel bags 4, 5 by quick attachment means 13, as shown in FIG. 10 and described above placed in the now contiguous recesses 68 and 39, 68 and 42.

Since a firm connection between the two rear wheel bags 4, 5 is thus constituted and this connection, as illustrated in FIG. 11, composes the upper surface of the knapsack 81, it is sufficient if the knapsack 81 consisting of three substantially torsionally rigid elements is held together in its lower area only by the Velcro-fastened strap pieces 82, 83.

The outwardly directed rear wall reinforcements of the rear wheel bags 4, 5 protect the contents of the bags from damage.

Two shoulder straps (not shown) are clipped into the eyelets 1 by snap hooks. In addition, it is possible for a further point for fixation of the shoulder straps to be provided centrally on that side piece 65 of the carrier 12 which faces the eyelets 21, so that the shoulder straps can be brought together on the cyclist's back.

Figure 12:
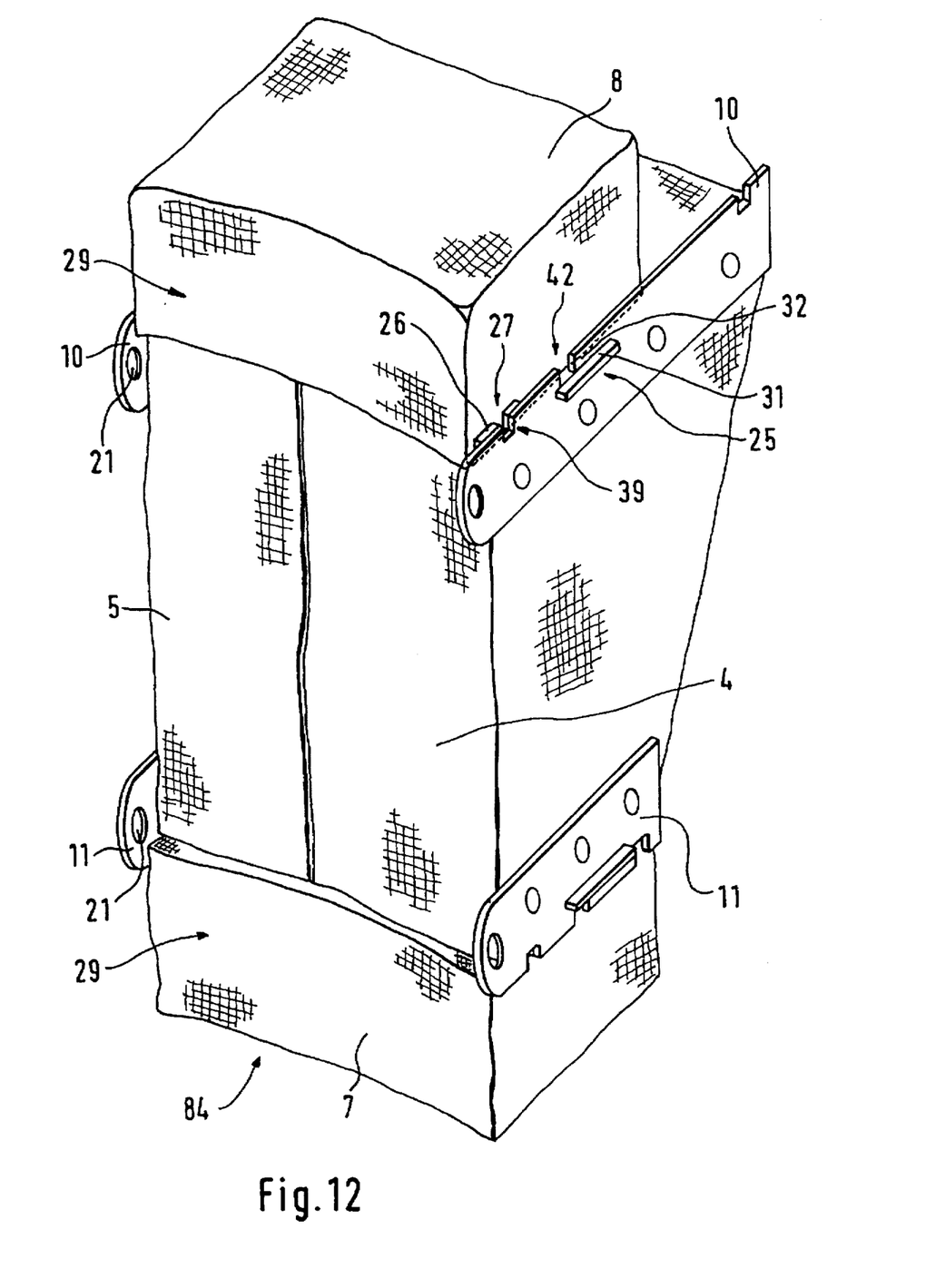
FIG. 12 is a perspective view of a knapsack formed by two rear wheel bags and two front wheel bags, the quick attachment means not being shown.
Figure 13:
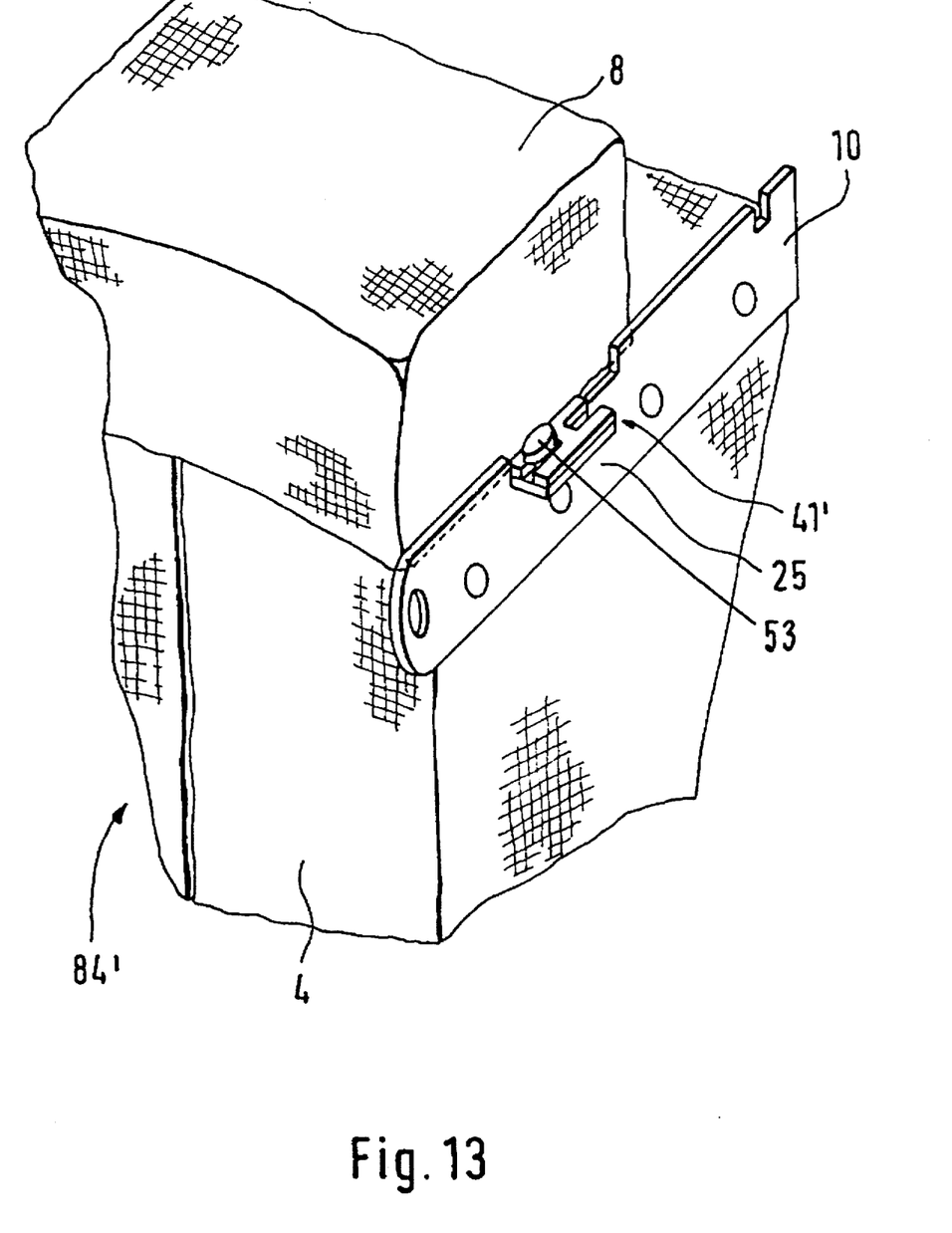
FIG. 13 is a perspective view of part of a knapsack formed by two rear wheel bags and two front wheel bags, the rear wheel bags having the reception device according to FIG. 7.

The rear wheel bags 4, 5 can be assembled together with the front wheel bags 7, 8, as shown in FIG. 12, to form a knapsack 84. In FIG. 12 the quick attachment means necessary for securely holding the knapsack 84 together are not shown.

The rear wheel bags 4, 5 are placed front sides together so that the fittings 10, 11 point outwards. The front wheel bag 8 is then inserted between the portions of the upper fittings 10 projecting above the pouches 9, with the slanting side portion 28 directed towards the eyelets 21. When inserting the front bag 8, the web 32 of the hanging element 25 is placed in the socket 42 and slid into the slot lengthwise of the fitting 10. Since the front wheel bag 8 is thus already fixed between the two upper fittings 10, it is necessary to provide only one quick attachment means (not shown) on each side for holding the knapsack 84 together. The quick attachment means is insertable in the contiguous recesses 39 and 27 of the upper fitting 10 and assembly angle 26.

If only the three bags 4, 5, 8 are to be assembled together to form a knapsack, the carrier 12 is inserted between the lower fittings 11 of the rear wheel bags 4, 5 in the above-indicated manner of FIG. 11 and connected to the fittings 11 by quick attachment means.

If a knapsack is to be composed of the four bags 4, 5, 7, 8, a next step involves turning over the three already interconnected bags 4, 5, 8 so that bag 8 is lowermost. The front wheel bag 7 is inserted between the lower fittings 11 now pointing upwards, in an analogous manner to that in which the front wheel bag 8 is fitted, and carrying straps (not shown) are fitted into the eyelets 21.

The concave sides 29 of the front wheel bags 7, 8 project over the sides of the rear wheel bags 4, 5 facing the cyclist's back, in order that only a relatively small area rests directly against the cyclist's back when carrying the knapsack 84. The comfort in carrying the knapsack 84 is thereby enhanced by the thus enabled circulation of air at the cyclist's 2 back.

It is suitable for the fittings 10, 11, the assembly angles 26 of the front wheel bag 7, 8 and the side pieces 65, 67 of the carrier 12 to be of the same thickness, permitting use of quick attachment means having a fixed abutment instead of the two-ribbed nut 74 and further simplifying connection of the component parts.

In the exemplary embodiment the rear wall reinforcement 46, the fittings 10, 11, 23, 24 and the carrier 12 are made of a carbon fibre-reinforced plastic-aluminium laminate in order to achieve high stability with the proviso of minimizing the weight to be attached to the bicycle. It is advantageous to use a honeycombed aluminium plate as the aluminium core, coated on both sides with the carbon fibre-reinforced plastic material.

I claim:

1. A fastening system for fastening at least two bags (4, 5, 7, 8) on a bicycle (1) in a first configuration and for fastening the at least two bags together to compose a knapsack (81, 84) in a second configuration, each bag having an external bag surface adapted to face the bicycle characterized in that the at least two bags include rigid fittings (10, 10', 11, 23, 24) secured on a rear wall reinforcement (46) located on each of the at least two bags (4, 5, 7, 8), at least one fitting on one of said at least two bags including a hanging element (25) and at least one fitting on the other of said at least two bags including a reception device (41, 41') for receiving the hanging element (25), wherein the bags (4, 5, 7, 8) are furnished in pairs, and complementary fittings are adapted to be positioned on the bicycle, the at least two bags being adapted to be removably positionable on the bicycle in the first configuration wherein the fittings on the at least two bags engage the complementary fittings on the bicycle and wherein the at least two bags are connected to each other to form the knapsack in the second configuration by the fittings on the at least first and second bags being releasably connected to each other such that the at least two bags are held closely together.

2. A fastening system as claimed in claim 1, characterized in that each said hanging element (25) is formed in a T-shape by a web (32) pointing away from the bag (7, 8) and by a retainer (31) arranged substantially at right angles to said web.

3. A fastening system as claimed in claim 1, characterized in that each said reception device (41) is formed as an L-shaped recess (41) by a socket (42) made in the periphery of the fitting (10, 11) and ending in a retaining slot (43).

4. A fastening system as claimed in claim 2 characterized in that a height of the web (32) of the hanging element (25) substantially corresponds to a thickness of the fitting (10, 11) having a reception device (41).

5. A fastening system as claimed in claim 2, wherein each said reception device (41) includes a retaining slot (43) and in a condition wherein the hanging element (25) is inserted in the reception device (41), the retainer (31) of the hanging element (25) projects lengthwise beyond the retaining slot (43).

6. A fastening system as claimed in claim 1, characterized in that each of the reception devices (41') has a fitting portion which is substantially 90° offset away from the rear wall reinforcement (46) and is provided with a pin (53) and a swivelling quick attachment means for securing the reception devices to the complementary fittings.

7. A fastening system as claimed in claim 1, characterized in that each of one hanging element (25) is centrally arranged on each of each fitting on the one bag (23, 24) in a position corresponding to a width of the one bag (7, 8) and projects vertically from a pouch (9) of the one bag (7, 8), and that each bag (7, 8) has an upper fitting (23) and a lower fitting (24).

8. A fastening system as claimed in claim 7, characterized in that the fittings (23, 24) which include the hanging element (25) are provided on two front wheel bags (7, 8).

9. A fastening system as claimed in claim 1, characterized in that one said reception device (41) is located on the fitting on the other bag (10, 11) at a position corresponding to a width of the other bag (4, 5) and projects vertically from a pouch (9) of the other bag (4, 5), and that each bag (4, 5) has an upper fitting (10) and a lower fitting (11).

10. A fastening system as claimed in claim 6, characterized in that the fittings (10, 11) including reception devices (41, 41') are provided on two rear wheel bags (4, 5).

11. A fastening system as claimed in claim 8, characterized in that the two front wheel bags (7, 8) having hanging elements (25) are releasably connectable with a fastener (52) which is adapted to be situated on a bicycle fork and has a pin (53) and a quick attachment means.

12. A fastening system as claimed in claim 11, characterized in that the front wheel bags (7, 8) each have a forked locating member (33) co-operatively connectable to a locating pin adapted to be provided on a fork blade (51) of the bicycle fork.

13. A fastening system as claimed in claim 10, characterized in that the two rear wheel bags (4, 5) having reception devices (41, 41') are adapted to be fastened to the bicycle (1) by way of a carrier (12) having three jointed members (15, 61, 62) including a carrying piece, wherein a length of the carrying piece (61) substantially corresponds to double the depth of a filled rear wheel bag (4, 5), and the two rear wheel bags are connected to the bicycle in the first position by way of a quick attachment means (19, 20) provided in the region of the rear wheel hub and quick attachment means provided between the reception devices and the carrying piece.

14. Bags (4, 5, 7, 8) with a fastening system for fastening the bags (4, 5, 7, 8) to a bicycle (1) in a first configuration and for fastening the bags together to form a knapsack (81, 84) in a second configuration, characterized in that the bags include connecting elements to releasably connect the bags to each other in the second configuration to form the knapsack, and to fasten the bags on complementary fittings with respect to said connecting elements adapted to be located on the bicycle in the first configuration, the connecting elements being arranged on rigid fittings (10, 10', 11, 23, 24) fastened to a rear wall reinforcement located on the bicycle facing sides of each bag such that when the bags are connected by the connecting elements in the second configuration, the bags are held closely together.

* * * * *